Nov. 9, 1926.
G. R. RICH
VALVE TAPPET
Filed June 23, 1926
1,606,181
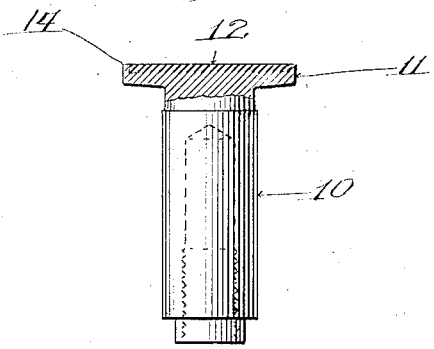
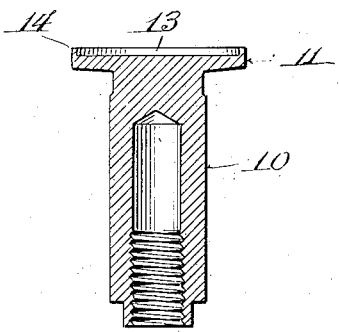
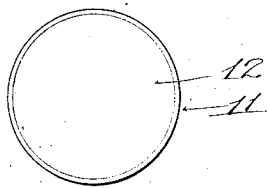
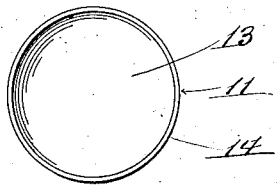
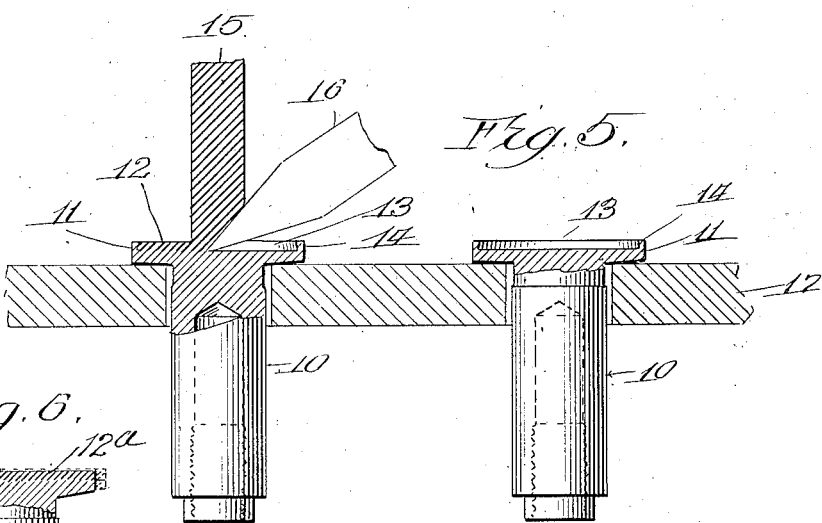
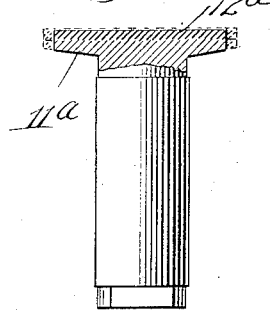

Patented Nov. 9, 1926.

1,606,181

UNITED STATES PATENT OFFICE.

GEORGE R. RICH, OF BATTLE CREEK, MICHIGAN.

VALVE TAPPET.

Application filed June 23, 1926. Serial No. 117,983.

This invention relates to valve tappets such as are employed in internal combustion engines for lifting or unseating poppet valves thereof. As is well known, considerable difficulty has been encountered in providing a valve tappet capable of successfully withstanding the wear on the bearing face of its head due to the friction caused by the cam in passing over it. This is particularly noticeable in high speed motors, where the abrasive action is more severe than in low speed motors. Many attempts have been made to remedy this difficulty, with more or less success, the successes being principally in connection with the higher priced motors. With medium or low priced motors, the better types of tappets are prohibitive on account of the cost thereof and for this as well as other reasons, many attempts have been made to furnish a practical wear resisting tappet that can be made and sold at a price acceptable to the motor manufacturers.

A tappet having a cast iron bearing face for the head is particularly advantageous, because of the wearing properties of cast iron, but the great difficlty in the manufacture of a valve tappet formed of a steel shank and a cast iron head or bearing face for the head, is that of uniting the cast iron portion with the steel body of the tappet, so that the two may withstand the vibrations and strains and remain permanently united, and another difficulty is to form such a union between the two pieces economically.

In accordance with the present invention I form a recess or cavity in the bearing face portion of the head and flow cast iron into the recess or cavity and unite it with the steel body so as to form an integral mass, by melting a bar of cast iron, and flowing it into the recess or cavity, with the electric arc welding process and simultaneously fusing together the cast iron and steel body.

The invention consists, therefore, in a valve tappet, formed of a steel body having a previously formed cavity in the bearing face portion of its head, into which is flowed a cast iron facing and fused thereto by the electric arc welding process.

It further consists in the several novel features hereinafter fully set forth and claimed.

The invention is clearly illustrated in the drawing accompanying this specification, in which:

Fig. 1 is a side elevation, partly broken away, of a valve tappet embodying one form of the present invention; Fig. 2 is a central, longitudinal section through the body portion of a tappet blank from which the tappet is made; Fig. 3 is a plan of the tappet; Fig. 4 is a plan of the blank seen in Fig. 2; Fig. 5 is a view partly in side elevation and partly in section, illustrating a step in the formation of the tappet, and Fig. 6 is a side view partly broken out showing a slightly modified form of the invention.

Referring to said drawing, and first to Figs. 1 to 5 inclusive, which illustrate one form of the invention, the reference character 10, designates the steel shank or stem portion of the valve tappet, 11 the head portion and 12 the cast iron bearing face portion of the head. The tappet shank may be made hollow if desired, and as shown the shank or stem portion 10 is bored out and tapped for the reception of the adjustment stud. The end of the shank or stem is flattened as usual for the reception of a wrench or other tool used in adjusting the adjustment stud, as is well understood.

In practice the shank and head portion of the rough piece are usually formed up from a bar or rod of steel in a power hammer, provided with suitable heading dies, and after the rough piece has been formed it is rough machined, the recess or cavity 13 is formed in its face portion, leaving the thin rim 14 around the recess, the shank is bored and tapped, and the piece is hardened as required.

To introduce into the recess, and unite the cast iron bearing face portion with the steel body, a stick or bar of cast iron is used (a fragment of which is shown at 15 in Fig. 5). An electric arc welding tool (a fragment of which is shown at 16 in Fig. 5) is employed for melting the stick of cast iron and fusing the molten mass to the body portion of the tappet. The exact process of melting the cast iron stick and fusing it to the body portion is not material to this invention broadly considered, but it is illustrative of one method of uniting the two metals. Several of the rough machined tappet pieces (similar to the one shown in Fig. 2) may be set in holes in a support 17

(see Fig. 5) for convenience in performing the work of uniting the two metals, and the workman places the end of a stick of cast iron 15 on the bottom of the recess or cavity 13 of the rough piece and applies the electric arc welding tool 16 to the end of the stick, thereby heating the same to a melting or fusing temperature, and at the same time heating the surface portion of the recess to a fusing temperature. The stick and point of the tool are moved around in the cavity, and enough cast iron is melted away from the stick to completely fill the cavity, and as the stick and tool are moved about in the cavity the cast iron flows away from the stick and because of the application of the intense heat from the electric arc welding tool, the metal flowing from the stick, and the metal of the body portion are fused together into one integral mass. The operator passes from one tappet body to another along the support, and when all have been treated they may be dumped into a container of water. When thus chilled suddenly the face portion becomes hard. If desired the shanks or stems of the pieces may be immersed in water during the fusing process so as to prevent excessive heating of the shank portion. The tappet is finished by grinding the various surfaces which require finishing.

In the form of the invention illustrated in Fig. 6, the head portion 11ᵃ of tappet blank is made oversize or slightly larger in diameter than the finished article, as is seen by the dotted lines, and the cast metal bearing portion 12ᵃ is flowed across the entire bearing face portion and arc welded thereto as in the other form. In finishing the tappet, the oversize allowed is machined off which gives a sharp outer corner around the circumference of the cast iron portion of the tappet head.

From the above it will be observed that a valve tappet is produced having a steel body portion and a cast iron bearing face portion for the head contained within the confines of the rim and made integral with the body. This tappet is not to be confused with any article in which a separate previously formed cast iron disc or facing is welded to the body. Such expedients are not practical and their usefulness is short lived. The friction vibration and heat generated by the rapid passage of the cams over such tappets, has a tendency to loosen the separate piece and when loosened or partially loosened it loses its usefulness and must be discarded.

A valve tappet containing the present invention can be made economically, it is practical, it is serviceable, useful and is more efficient than any tappet now on the market which can be manufactured and sold at a price in competition with the present one.

I claim as new, and desire to secure by Letters Patent:

1. A composite metal valve tappet comprising a steel shank and head portion and a cast iron facing on the bearing face side of the head portion integrally united with said head portion.

2. A valve tappet comprising a steel tappet body having a shank and a head portion thereon formed with a rim at its bearing face portion, and a cast iron bearing face portion contained within the confines of said rim and being an integral part of said body portion.

3. A valve tappet comprising a steel body having a shank and a head portion thereon formed with a rim at its bearing face portion, and a cast iron bearing face portion contained within the confines of said rim portion and being an integral part of said body portion.

4. A composite metal valve tappet comprising a steel body having a shank and a head portion thereon formed with a rim at its bearing face portion, and a cast iron bearing face portion contained within the confines of said rim and integrally united with said rim portion and with the remainder of the head.

GEORGE R. RICH.